US007430196B2

(12) United States Patent
Turunen

(10) Patent No.: US 7,430,196 B2
(45) Date of Patent: Sep. 30, 2008

(54) TRANSMISSION SYSTEMS

(75) Inventor: Seppo Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 384 days.

(21) Appl. No.: 11/035,907

(22) Filed: Jan. 14, 2005

(65) Prior Publication Data

US 2006/0159055 A1 Jul. 20, 2006

(51) Int. Cl.
 *H04B 7/216* (2006.01)
 *H04B 7/00* (2006.01)
 *H04J 3/06* (2006.01)
 *H04J 15/00* (2006.01)
 *H04L 7/00* (2006.01)
 *H04L 25/38* (2006.01)

(52) U.S. Cl. .................. 370/342; 370/310; 370/350; 370/464; 370/503; 370/509; 370/512; 375/365; 375/367; 375/368

(58) Field of Classification Search ............ 370/310, 370/342, 350, 464, 503, 509, 512; 375/365, 375/367, 368
See application file for complete search history.

(56) References Cited

U.S. PATENT DOCUMENTS

| | | | |
|---|---|---|---|
| 3,594,502 A | 7/1971 | Clark | 178/69.5 R |
| 3,754,102 A | 8/1973 | Clark | 179/15 BS |
| 3,946,161 A | 3/1976 | Husted et al. | 179/15 AF |
| 4,688,210 A * | 8/1987 | Eizenhofer et al. | 370/335 |
| 4,860,323 A | 8/1989 | Malter | 375/111 |
| 4,968,981 A * | 11/1990 | Sekine et al. | 342/356 |
| 5,798,732 A | 8/1998 | Eshenbach | 342/357.12 |
| 6,089,749 A * | 7/2000 | Blaum et al. | 714/798 |
| 6,873,664 B1 | 3/2005 | Clark | 375/340 |

(Continued)

FOREIGN PATENT DOCUMENTS

EP 1089471 A2 4/2001

(Continued)

OTHER PUBLICATIONS

"Partial-Prefix Synchronizable Codes", Adriaan J. van Wijngaarden, IEEE Transactions on Information Theory, vol. 47, No. 5, Jul. 2001, pp. 1839-1848.

(Continued)

*Primary Examiner*—Lester Kincaid
*Assistant Examiner*—Nathan Mitchell
(74) *Attorney, Agent, or Firm*—Harrington & Smith, PC

(57) ABSTRACT

A receiver comprising a processor having an input to receive a sequence of transmission frames conforming to a transmission protocol to represent payload data,
 a memory arranged to store and to provide to the processor a transmission protocol,
 a code provider arranged to provide to the processor one or more predetermined codes for association in a predetermined distributed manner within a group of transmission frames of a transmission sequence to represent one or more particular positions in the group of transmission frames,
 and wherein the processor is arranged to compile at least a portion of one or more distributed codes from a group of transmission frames of a transmission sequence received at the input using the predetermined distributed manner of the one or more predetermined codes received from the code provider, and to compare one or more compiled portions of one or more codes with the one or more predetermined codes received from the code provider to determine one or more particular positions in the group of transmission frames.

44 Claims, 5 Drawing Sheets

U.S. PATENT DOCUMENTS

| | | | |
|---|---|---|---|
| 6,959,030 B1 | 10/2005 | Clark | 375/130 |
| 7,054,350 B2 * | 5/2006 | Keller et al. | 375/137 |
| 7,227,885 B2 * | 6/2007 | Gurney et al. | 375/149 |
| 2004/0047333 A1 * | 3/2004 | Han et al. | 370/350 |
| 2004/0179510 A1 * | 9/2004 | Kuffner et al. | 370/350 |
| 2004/0213295 A1 * | 10/2004 | Fehr | 370/503 |

FOREIGN PATENT DOCUMENTS

| | | |
|---|---|---|
| WO | WO-01/97478 A2 | 12/2001 |

OTHER PUBLICATIONS

"Synchronization of Binary Messages", E. N. Gilbert, IRE Transactions On Information Theory, Sep. 1960, pp. 470-477.

Pratt, A. R. et al., "Concatenated Sequential Codes Performance Attributes and Applications for Galileo," Jan. 26, 2004, pp. 313-322, proceedings of the ION National Technical meeting, the Institute of Navigation.

De Lind Van Wijngaarden, A. J. et al., "Frame Synchronization Using Distributed Sequences," Dec. 2000, pp. 2127-2138, IEEE Transactions on Communications, vol. 48, No. 12.

* cited by examiner

TRANSMISSION SYSTEMS

TECHNICAL FIELD OF THE INVENTION

The invention relates to the field of transmission systems and includes transmitters and receivers used in the transmission of information. The invention encompasses devices and apparatus incorporating transmission technology and includes digital and analogue transmission systems, and associated methods of operation. The invention also encompasses wired and wireless transmission systems.

Although much of the forgoing description is focussed on satellite positioning systems, such as the US Global Positioning Satellite (GPS) System or Galileo (the European Satellite System under current development), all embodiments of the invention should not be considered to be limited to such satellite positioning systems. For example, embodiments of the invention can encompass systems which exclusively comprise cellular transmission systems, such as GSM and UMTS or CDMA2000, or include cellular systems in combination with other transmission systems (such as satellite positioning systems).

BACKGROUND TO THE INVENTION

Within the context of this specification, information is considered to be the meaning that a human assigns to data by means of the known conventions used in their representation. Data is considered to be a representation of facts, concepts, or instructions in a formalized manner suitable for communication, interpretation, or processing by humans or, in particular, by electronic device processors.

It is well known in the art that information to be transmitted is converted into data and is transmitted, using a frame format, in digital and or analogue form. A transmission frame is considered to be a repeated data structure, often beginning and ending with delimiters, such as prefixes, that consist of fields predetermined by a protocol for the transmission of payload data and control data. In the context of GPS, the term frame can be used to include reference to the terms word, sub-frame and frames, each of these having a repeated data structure and having a specific meaning within GPS.

A protocol is a formal set of conventions governing the format and control of interaction among communicating functional units, such as transmitters and receivers. The fields, and thus the transmission frame, are made up of bits, which represent the data in a binary digit form. The protocol governs the form of the repeated data structure.

Payload data is considered to be the data which is the subject of the transmission, and control data is the data which is required to transmit the user data. Control data may include, for example, the prefixes, frame length information (particularly in the case of variable frame length frames), and error correcting codes/parity bits.

Bit synchronisation is considered to refer to the identification of the boundary of bits i.e. allows the recognition of bits. Frame/word synchronisation occurs at a layer above bit synchronisation, and is considered to be the identification of the boundaries of frames i.e. allows the recognition of frames. These processes are required prior to actually interpreting the content of the frame.

Bit and frame synchronisation are key in transmission systems. Transmission systems are affected by noise. Solutions are required which are robust under noisy transmission condition. Some aspects and embodiments of the present invention address the problem of noise and their effect on frame synchronisation and their effect on the interpretation of frame content.

In order to meaningfully decode data contained in a sequence of frames (i.e. decipher the data content from the frames), the frame order of a frame in a sequence of frames must be obtained. This frame order data is provided within the frame structure. This deciphering process is done once bit and frame synchronisation have occurred. Aspects and embodiments of the present invention relate to the identification of the frame order of a frame in a sequence of frames.

Satellite systems utilise the time delay between a transmitted frame and the time at which the transmitted frame was received at a receiver. Basically, the time delay between the transmission and reception of the frame is used to work out the distance to the satellite, given the known transmission speed (speed of light) of the frame. Distances to a number of satellites are used to triangulate the position of a receiver.

Although four satellites are typically used for triangulation, a smaller number of satellites may be sufficient if external information is also available. This external information may be velocity, altitude from a barometer, or the propagation delay from a cellular basestation in a known location. Furthermore, if more than four satellites are visible, the signals from addition satellites can be used to improve accuracy.

Specifically, satellites provide the time at which the frame was transmitted, within the frame. The transmission times of each frame can be considered to be the frame order. This is because each frame will have its own transmission time and a subsequent frame will have a "later time" than an earlier frame.

The positioning satellite receiver utilises a local receiver time in the determination of time delay. Cellular assistance in GPS has made it possible to get local receiver time information from the cellular network. However, this is not a mandatory feature in GSM and WCDMA Standards. Furthermore, cellular assistance is also not available if the cellular network connection is lost. There are also technical and commercial problems in the availability of cellular assistance in GSM and WCDMA networks.

The existing GPS frame structure does not support time transfer (the time at which a signal is transmitted) when the satellite signal is weak. The time information is encoded in a 17 bit time-of-week field that is repeated once in 6 seconds. Thus, the time information field is prone to burst noise.

Specific embodiments of the present invention relate to satellite positioning signal design, especially the on-going design of Galileo signal frame structures. The present invention supports weak signal operation, particularly when accurate time assistance is not available from the cellular network, as is the case in most GSM and WCDMA networks.

As previously outlined, synchronisation of frames is essential in communication systems as it is necessary to know the boundaries of frames at the receiver side before decoding can take place. Commonly, but not always, the beginning of every fixed or variable length frame is identified by a contiguous sequence called a prefix. The prefix is used to identify the beginning of the frame. In the case of GPS, the prefix is used to synchronise the receiver.

Let us now turn to the issue of frame synchronisation in transmission systems.

To avoid the occurrence of the prefix elsewhere in the frame, one or more prefix synchronized codes (ps-code) are used for frame synchronisation in some transmission systems. However, they are not used in satellite navigation systems.

Ps-codes have the property that they modify the payload data such that the bit sequence corresponding to the the prefix does not occur in any codeword or in any concatenation of codewords in any position other than the first position i.e. the prefix is a special bit sequence that does not appear elsewhere in the bit stream, neither inside frames nor across the boundaries between the frames. Therefore, they can uniquely identify the beginning of a frame.

Prefix-synchronized codes have been proposed to facilitate frame/word synchronization in noiseless and noisy data transmission channels. Prefix-synchronized codes are discussed e.g. in E. N. Gilbert, "Synchronization of binary messages", IRE Transactions of information theory, September 1960. A more recent discussion can be found in: A. J. Wijngaarden, "Partial-prefix synchronizable codes", IEEE Transactions on information theory, no. 5, July 2001.

GPS signals already have certain repetitive bit patterns which act as prefixes. The patterns were not planned for weak signal synchronization and their usefulness for that purpose is marginal since they are not uniquely distinguishable, not repeated at constant time intervals, and appear infrequently. In U.S. Pat. No. 5,798,732, a method is described for using certain repetitive bit fields in GPS messages for timing.

Current transmissions systems, including existing GPS systems, assume that the prefixes are received error free. This assumption is not always valid. Aspects and embodiments of the present invention provide the analysis of prefixes to detect the timing of a repeated data structure, such as a word, or a sub-frame, or a frame. This can be in satellite transmissions systems.

Furthermore, aspects and embodiments of the present invention can be employed when the signal is so weak that data bits cannot be detected reliably enough for data reception. In such weak signal situations, the timing cannot be detected reliably in the prior art from ordinary frame delimiters or other similar bit patterns.

SUMMARY OF THE INVENTION

In a first aspect, the present invention provides a receiver comprising a processor having an input to receive a sequence of transmission frames conforming to a transmission protocol to represent payload data,
- a memory arranged to store and to provide to the processor a transmission protocol,
- a code provider arranged to provide to the processor one or more predetermined codes for association in a predetermined distributed manner within a group of transmission frames of a transmission sequence to represent one or more particular positions in the group of transmission frames,
- and wherein the processor is arranged to compile at least a portion of one or more distributed codes from a group of transmission frames of a transmission sequence received at the input using the predetermined distributed manner of the one or more predetermined codes received from the code provider, and to compare one or more compiled portions of one or more codes with the one or more predetermined codes received from the code provider to determine one or more particular positions in the group of transmission frames.

The code provider provides the code to the processor. The processor also knows that the code is associated with a group of transmission frames in a predetermined manner to represent one or more particular positions in the group of transmission frames. The processor can compare this code, which is received from the code provider, with the code the processor compiles from the code, which is distributed within a group of frames, received at the input. As the processor knows that the code is associated with one or more particular positions, a comparison of the two codes can be used to determine one or more particular positions in the group of frames received at the input.

As the position information is distributed within the group of transmission frames rather than completely contained in one or more transmission frames, the positional information is less likely to be lost by "burst noise" i.e. over a short period. Subject to the nature of the predetermined code, the positional information is also less likely to be lost over prolonged noise period.

Such a receiver may provide frame synchronisation, for example, if the code was always positioned at the beginning of a frame. From a knowledge of such one or more particular positions of the group of transmission frames, the processor can then, from a knowledge of the transmission protocol, determine the position of one or more payload fields, and/or one or more control fields. Such knowledge of the protocol could be the frame length and the position of one or more payload/control field in relation to the determined position within the group of frames.

The present invention could be applied following frame synchronisation by any method/arrangement, including according to arrangement of the first aspect.

In such a case, the determination of one or more particular positions would be the determination of the data from the particular positions, this data being compiled from the code in the sequence of transmission frames.

The distributed code may represent payload data. The payload data may represent the time of transmission of a frame.

For example, in an embodiment of a satellite navigation receiver, the code provider may provide pre-defined transmission time data, and wherein the group of frames received at the input comprise payload data representing the time at which one or more particular frames are transmitted from a particular satellite transmitter, the time data being the code which is distributed in the group of frames, and wherein the processor is arranged to identify the position of the time data distributed within the group of frames to compile the time data from the distributed code, compare the compiled time data with the pre-defined time data provided by the code provider to determine the time of transmission of one or more particular frames from the satellite transmitter.

For the avoidance of doubt, the identification of the position from the code can be a feature of frame synchronisation or a feature following frame synchronisation. Following frame synchronisation, the determination of one or more position of the code can be considered to be the determination of the code content at that position.

The satellite receiver may compare the alignment of the compiled time data and the pre-defined time data.

The pre-defined time data may be a replica of the un-distributed code which is distributed in the sequence of transmission frames, wherein a particular "origin/reference" position in the replica is associated with a particular absolute/reference transmission time.

By knowing that the "origin" position of the replica is associated with a particular absolute transmission time, it is possible to compare the replica and the compiled time data to identify the mis-alignment between the time data contained in a particular frame and the origin position of the replica in order to calculate the transmission time of the particular frame. This may be done by knowing the additional time in relation to the absolute time that corresponds to the mis-alignment.

This calculation may be performed by a processor, possibly the aforementioned processor.

The distributed time data may be a repeating pattern, the start of the repeating pattern being associated with an absolute instant in time.

The code provider may be a shift register with logic gates providing feedback. The code provider may be comprised in memory. The code provider may be comprised in the transmission protocol memory.

The position within the group of frames may be the position of a first frame. The position of subsequent frames may be derived from a knowledge of the transmission protocol. For example, if the frames are of a fixed length, the position of the second and any subsequent frames can be determined for a multiple of the fixed length. The frame length information may be derived from the transmitted frames.

One or more positions may comprise the beginning and or end of the group of transmission frames. The one or more positions may be the middle of the group of transmission frames.

For example, the predetermined manner may provide that the code is provided at the beginning of each frame. Thus, the position determined would be the beginning of each frame.

One code may be used to represent one or more positions. Two or more codes may be used to represent the same one or more positions.

The portion may represent the entire code or a significant distinguishable portion of one code.

The group of transmission frames may comprise a consecutive sequence of transmission frames. One code may be provided in each of a consecutive sequence of the group of transmission frames and therefore be determined from the consecutive sequence of the group of transmission frames.

One code may be represented by one or more bits, which are distributed in a group of transmission frames in a predetermined manner. Thus, the bits representing the code are not completely contained within one frame but are distributed within the group of frames.

The predetermined manner may provide that one code occupies one bit position in a frame. One code may occupy the same bit position in a frame. One code may occupy the same bit position in each frame of the group of frames.

A plurality of codes may be provided. This at least provides some redundancy. Furthermore, the examination of two or more codes is likely to lead to a faster determination of the position within the group of frames than examination of a single code.

Two or more codes may occupy spaced apart bit positions in a frame. Two or more codes may be spaced towards opposing end positions of a frame.

Two or more codes may occupy adjacent bit positions in the same frame. Three or more codes may occupy adjacent bit positions in the same frame.

One code may be a pseudorandom code. These are comparatively easily identifiable.

One code may be a different length to another code.

Two or more codes may be different pseudorandom codes.

Each of three codes may be pseudorandom codes each having a different length.

A plurality of codes may be provided, two codes having different bit sequence lengths which do not have a common factor. This means that the different bit sequence lengths can't be divided by the same integer number. This provides that the number of frames covered by the bit sequences is comparatively large as the different code lengths will tend to remain out of synchronisation (if you consider them to start from the same position).

One code may be comprised of a 127 bit sequence. One code may be comprised of a 255 bit sequence. One code may be comprised of a 511 bit sequence.

One code may be evenly distributed in each of the transmission frames of the group of transmission frames. Thus, each frame contains the same percentage of the complete code. However, one or more frames in the group of frames may contain a bigger percentage of the code than one or more other frames in the group of frames.

The frame may comprise a repeated data structure. The repeated data structure may be a word, sub-frame or frame. The data structure may have a fixed length. The data structure may have a variable length. In the case of a variable length data structure, the variable length may be provided with the data structure.

The position within the group of frames may be used to identify the frame order of one or more frames.

The position within the group of frames may be used to determine the position of data representing the transmission time of one or more frames.

The position within the group of frames may be used to determine the position of data representing the transmission time of one or more frames, wherein the transmission time is represented by a repetitive counter arranged to increment between minimum and maximum indicia. This may be an increasing or decreasing counter.

The code may repeat.

The frames may comprise additional payload data representing the current position of a satellite. This may change over the expected position due to gravitational and or other forces. In such a case, the receiver is updated the expected position with the correct position.

The frames may comprise fixed frame lengths. In such a case, the memory may contain the fixed frame length, and the processor is arranged to consider the fixed frame length to identify the expected position of one or more predetermined code bits in the group of frames.

The position of distributed payload time data may be provided in the memory.

Time delay can be determined by comparing the determined transmission time with the reception time in a conventional manner.

The receiver may be a satellite navigation receiver. The receiver may be a satellite navigation receiver, such as a GPS/Galileo receiver. The receiver may be a cellular receiver. The receiver may be a combination of a satellite and a cellular receiver. The receiver may be a wireless receiver arranged to receive transmission over a wireless interface. The receiver may be a wired receiver arranged to receive transmissions over a wired interface.

It will be appreciated that aspects and embodiments of the invention can be used for frame synchronisation, or following frame synchronisation by any method, the determination of the position and/or content of particular payload and/or control data.

In a second aspect, the present invention provides a transmitter comprising a processor having an input to receive payload data, the processor being arranged to represent the payload data as a sequence of transmission frames conforming to a transmission protocol, a memory comprising a transmission protocol, the memory arranged to provide the transmission protocol to the processor, a code provider arranged to provide to the processor one or more predetermined codes for association in a predetermined distributed manner within a group of transmission frames of a transmission sequence to represent the one or more particular positions in the group of transmission frames of the transmission sequence, wherein the processor is arranged to associate the one or more predetermined codes in a predetermined distributed manner within a group of transmission frames of the transmission sequence received at the input to represent one or more particular positions in the group of transmission frames.

In a third aspect, the present invention provides a receiver module comprising a code provider and processor according to the first aspect of the invention.

In a fourth aspect, the present invention provides a transmitter module comprising a code provider and processor according to the second aspect of the invention.

A method of receiving a signal in accordance with a receiver arranged according to the first aspect is also provided. A method of transmitting a signal in accordance with a transmitter arranged according to the second aspect is also provided.

The present invention also encompasses an encoder having a transmitter module according to the second aspect of the invention and a decoder having a receiver module according to the first aspect of the invention. Methods of encoding and decoding signals are also within the scope of this invention.

An appropriately modified signal comprising a sequence of transmission frames having a predetermined code in a distributed in a predetermined manner is also within the scope of this invention.

In a fifth aspect, the present invention provides a receiver comprising an input to receive a sequence of transmission frames, each frame having a frame length and comprising a sequence of bits, wherein a portion of the sequence of bits are for providing a synchronisation prefix having a prefix length, wherein the receiver comprises a processor arranged to analyse a first sequence of bits having a length corresponding to a prefix length and a second sequence of bits having a length corresponding to a prefix length, and wherein the first and second analysed prefix length bit sequences are spaced apart by a frame length, and wherein the processor is arranged to average the analysed prefix length bit sequences and compare the average to one or more predetermined threshold to determine the presence of a synchronisation prefix.

One predetermined threshold may be used. Two, three or more thresholds may be used.

The comparison may be to consider whether the average exceeds a predetermined threshold. The comparison may be to consider whether the average is below a predetermined threshold. The comparison may be to consider whether the average meets the predetermined threshold.

The prefix may be a bit sequence completely comprised of 1s. The prefix may be a bit sequence completely comprised of 0s. The bit sequence may be a repetitive pattern consisting of 1s and 0s. It may comprise a repetitive pattern of 10 or 01.

The synchronisation prefixes may be provided at the beginning of each frame to designate the beginning of a frame.

The receiver may average two or more frame length spaced apart prefix length bit sequences. For example, three, four, five . . . ten such bit sequences may be averaged.

The receiver may analyse a first set of a first and second frame length spaced apart prefix length bit sequences, and if the predetermined threshold has not been met, then analyse a second different set of a first and second frame length spaced apart prefix length bit sequences. Such analysis can be considered to be serial in nature.

The receiver may analyse a first set of a first and corresponding frame length spaced apart second prefix length bit sequence, and a second different set of first and corresponding frame length spaced apart second prefix length bit sequence at the same time. Such analysis can be considered to be parallel in nature. The parallel analysis of more than one set will lead to a faster identification of the synchronization prefix.

The first and second sets represent different bit sequences. The sequences of the first and second sets may overlap or may represent completely distinct portions of the sequence.

The receiver may comprise a memory to store one or more predetermined thresholds.

The invention encompasses one or more aspects and or embodiments of the invention in various appropriately adapted one or more combinations, in accordance with the aforementioned and subsequently-mentioned aspects and embodiments of the invention. The invention also comprises appropriately modified computer programs, signals and portable electronic devices. A portable electronic device may be a device with cellular telephone functionality.

BRIEF DESCRIPTION OF FIGURES

Specific embodiments of the invention will be now be described with reference to the following Figure in which.

DESCRIPTION OF SPECIFIC EMBODIMENTS

Figure 1:
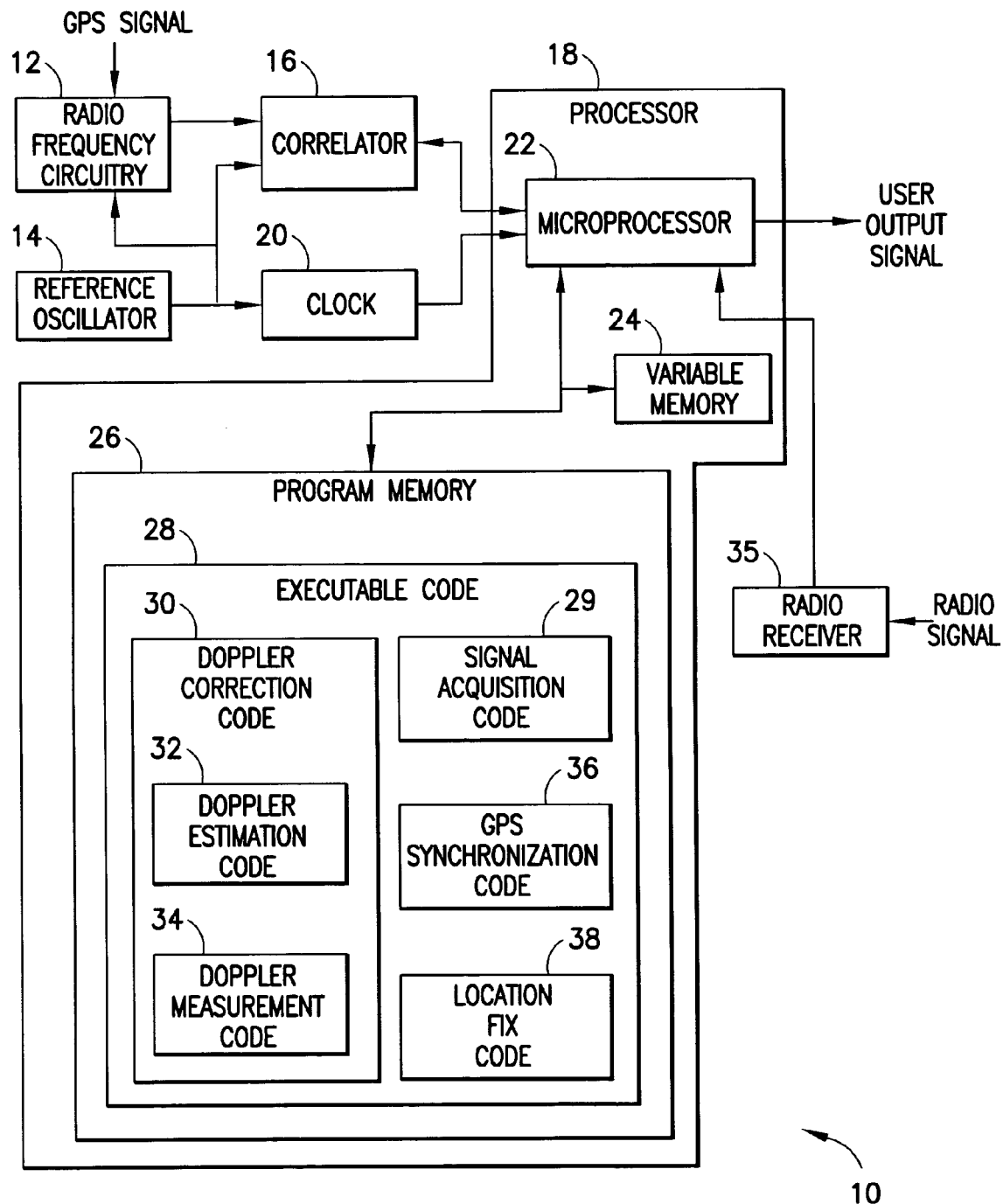
FIG. 1 is a block diagram of a GPS receiver.

Consider a positioning satellite system, such as that shown in FIG. 1. For a detailed understanding of FIG. 1, refer to U.S. Pat. No. 5,798,732.

Typically, when the GPS receiver is first turned on, it knows its own approximate location, an approximate local clock time, and an almanac or ephemeris information for the locations-in-space of the GPS satellites as a function of time. The GPS receiver processes its location, the approximate local clock time, and the almanac or ephemeris information to determine which of the GPS satellites should be in-view and generates a GPS replica signal having one or more pseudorandom noise (PRN) codes that match one or more PRN codes of the in-view GPS satellites.

The GPS satellite signal is acquired by synchronizing (correlating) a frequency and a phase of the GPS replica signal to a frequency and a phase of the GPS satellite signal. When correlation is achieved the GPS receiver monitors the GPS data bits until a start of a subframe is recognized. When the start of the subframe is recognized, the GPS receiver reads the GPS data bits in a hand over word (HOW) to learn a GPS-based clock time. A current precise location-in-space of the GPS satellite is calculated from the GPS-based clock time and the ephemeris information.

The GPS-based clock time and the phase of the GPS replica signal is used to calculate a pseudorange from the location of the GPS receiver to the GPS satellite. The geographical location fix is derived by solving four simultaneous equations having the locations-in-space and the pseudoranges for four or more GPS satellites.

Embodiments of the present invention provide a way to transmit the satellite navigation system based clock time e.g. GPS-based clock time. The present invention equips each data word (of, e.g., 30 bits as in GPS) with only a small number of time information bits and divides the full time information among two or more consecutive data words. The invention further uses an encoding that allows the receiver to apply coding gain to extract the timing from the time information bits of consecutive words in conditions where noise prohibits the reliable detection of individual bits.

The present invention allows timing to be extracted rapidly under good signal conditions by observing the time information bits of just a few (typically less than ten) data words. This allows the worst-case delay for time detection to be short (about one second in Galileo).

The invention also allows timing to be extracted reliably in conditions where it is not possible for a GPS C/A (GPS coarse acquisition signal, the ordinary civil GPS signal) receiver. This can be done by collecting a longer sequence of time information bits and correlating it with a locally generated replica sequence in different phases. The time needed for reliable detection depends on the received signal S/N ratio.

The invention is particularly suited to a situation where carrier synchronization is provided by some other mechanism, e.g. by a pilot code (Galileo and future GPS will have pilot codes), because the necessary integration needed to achieve coding gain can then be done coherently.

The invention is particularly suited to a case where bit synchronization is provided externally, because all suggested operations are on bit level. It is likely that the pilot codes of Galileo and future GPS will support bit synchronization.

The invention is particularly suited to a case where word or frame synchronization is provided externally, because the location of the timing bits within the received data stream is then known to the receiver.

The following example is one possible implementation of the invention.

Consider a positioning satellite transmission system in which a satellite transmission consists of an endless stream of 30 bit data words indexed with the letter i, i varying from 1 to n. Each data word therefore has the same length.

The transmitter generates a pseudorandom code comprising a pseudorandom sequence of bits $a_i$ having a particular length, which has an "origin/reference" bit or starting bit $a_j$. The origin bit of the code is associated with a particular absolute/reference moment in time e.g. a particular time, on a particular day, in a particular week (possibly in a particular month or in a particular year). This corresponds to the transmission time of the origin bit.

The transmitter encodes payload data into a repeated data structure (e.g. word/frame) conforming to a protocol. It provides one bit of the pseudorandom sequence of bits in each adjacent word at a particular predefined position, say at the bit position 5 in each word. Each subsequent bit in each adjacent word designates a time increment from the origin bit.

Figure 2:
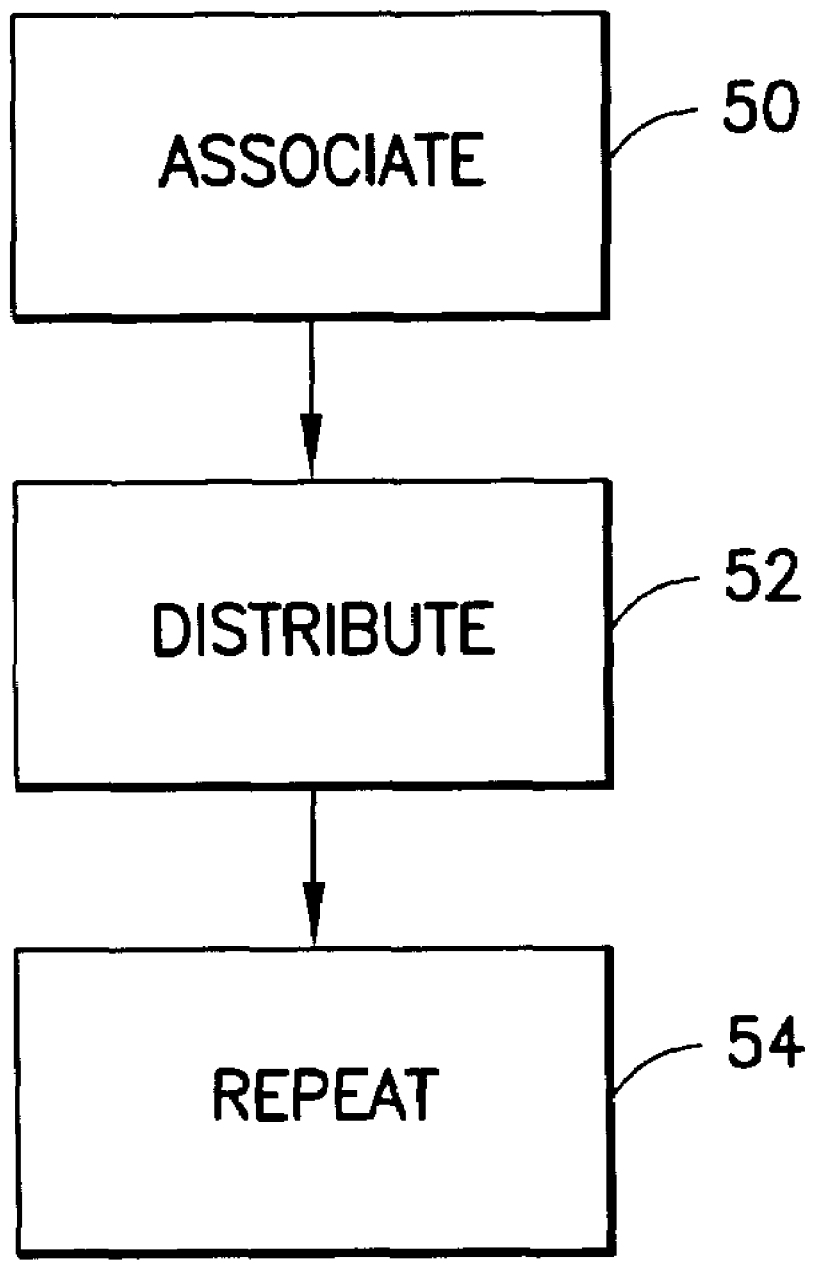
FIG. 2 shows the sequential steps involved in encoding transmission frames with distributed time data in a transmitter according to one embodiment of the invention.

Once the last bit of the pseudorandom sequence of bits has been placed in a word, the pseudorandom sequence of bits is repeated from the origin bit (FIG. 2). Thus, referring to FIG. 2, sets can comprise associating the start reference bit of a known pseudorandom code with a particular time instant as indicated by block 50, distributing one bit taken sequentially from the pseudorandom code, starting from the reference bit, in each transmission frame at the same position within each transmission frame, to represent the respective transmission time of each frame offset from the start reference bit time instant as indicated by block 52, and when you get to the end of the pseudorandom code, repeating the code again beginning from the start reference bit as indicated by block 54.

Let us assume that frame synchronisation has already occurred at the receiver. The receiver compiles the bits $a_i$ from bit position 5 of each adjacent words to generate the pseudorandom code, starting from the bit in the first word received at the input.

The receiver has knowledge of the pseudorandom code which the transmitter is providing in sequence of word. It compares the compiled code to knowledge of the pseudorandom code the receiver has to look for a match in the compiled and known codes. As the codes are pseudorandom, the unique match should be identified quite readily.

This match may be provided by, for example, comparing the first 8 bit sequence of the compiled code with the known code. Once the match has been identified, the position of the 8 bit sequence of the compiled code is known within known pseudorandom code. Therefore, the position of the 8 bit sequence (each one of these bits respectively derived the first 8 adjacent words) can be compared to the origin bit, $a_j$, of the pseudorandom code. Given the time increments, the absolute transmission times of the first, second third etc words can be derived.

For example, consider that the position of the first bit of the 8 bit compiled code is not the origin bit $a_j$, but is bit 50, $a_{50}$, from the pseudorandom sequence. The receiver knows that bit 50 is provided in the first frame. The receiver can calculate that as the bit in the first frame corresponds to 50 positions after the origin bit, the first frame was transmitted at 50 time increments from the origin bit transmission time (FIG. 3).

Figure 3:
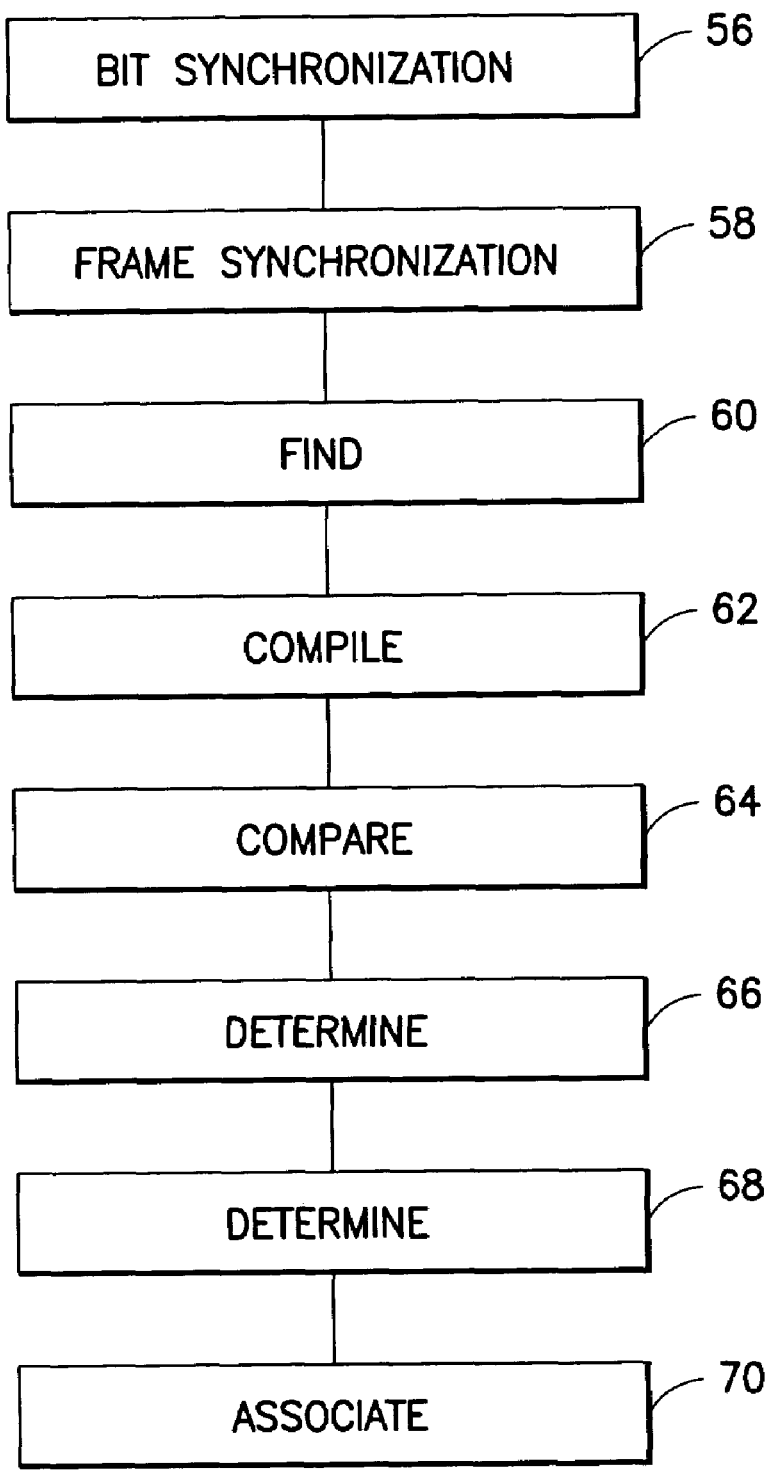
FIG. 3 shows the sequential steps involved in decoding distributed time data from transmission frames in a receiver according to one embodiment of the invention.

As seen with reference to FIG. 3, bit synchronization can be performed as indicated by block 56, frame synchronization can be performed as indicated by block 58, the transmission time payload code bit can be found from frames 1-8 received at the input as indicated by block 60, the transmission time payload bits from frames 1-8 can be compiled to form a compiled bit sequence code starting with the bit from the frame 1 as indicated by block 62, the compiled bit sequence code with the known code can be compared to find the position of the matching sequence of bits in the known code as indicated by block 64. If no match is found, more bits can be cornpiled. The relative position of the start reference bit and the matching sequence of bits in the known code can be determined to determine the time offset for the matching sequence of bits from the start reference bit as indicated by block 66. The time offset of the compiled sequence of bits from the time offset of the matching sequence of bits can be determined as indicated by block 68. The time offset of each bit of the compiled sequence of bits can be associated with the frame from which the bit came to determine the transmission time of each frame as indicated by block 70.

Figure 4:
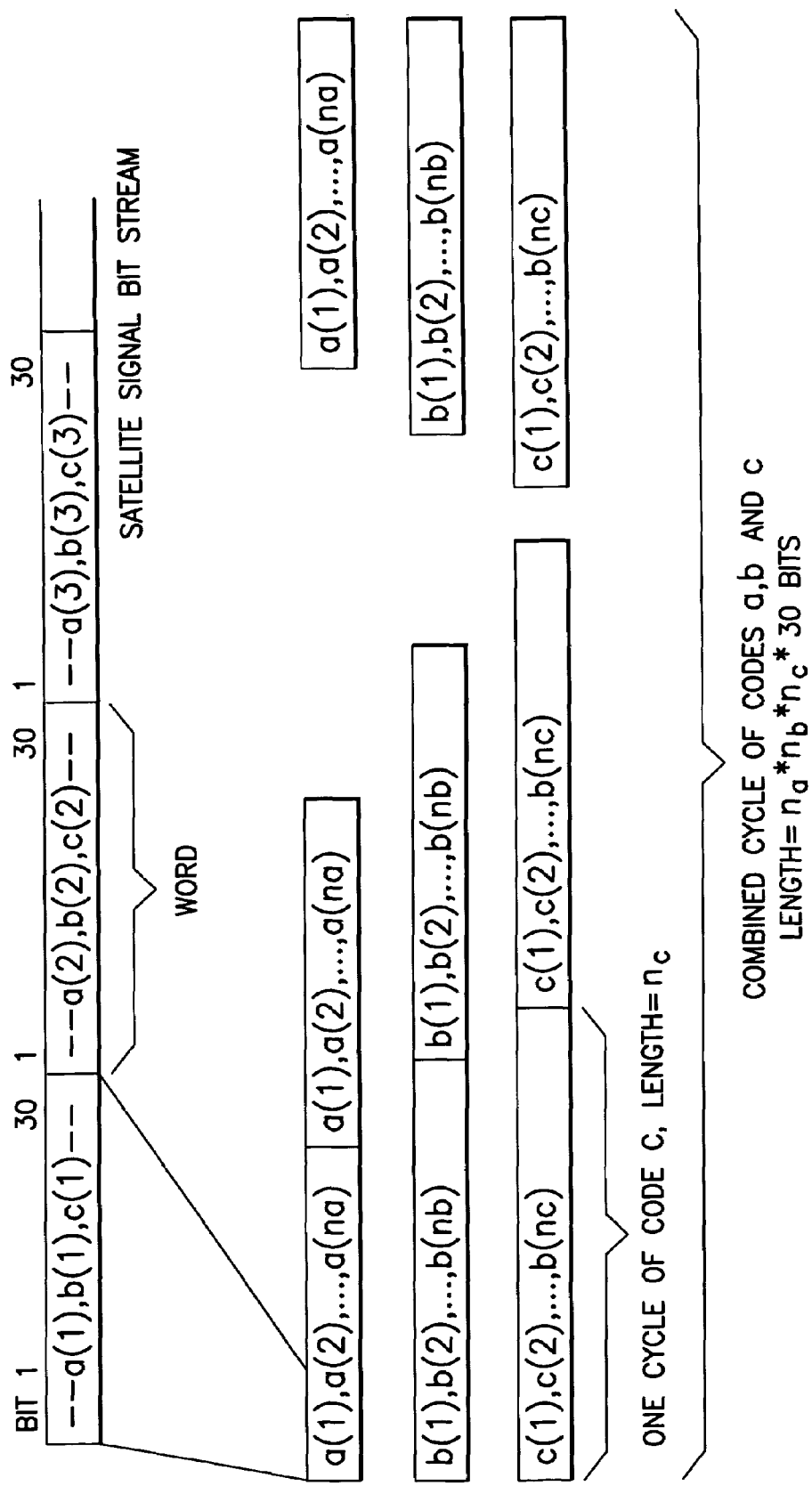
FIG. 4 represents in diagrammatic form how the proposed time information bits of the invention are to be embedded in a satellite bit stream and how the code cycles of the individual time information bits relate to each other according to one embodiment of the present invention.

Consider the developed embodiment of FIG. 4, which is a representation of a 30 bit satellite signal transmission frame. In each word, three bits, $a_i$, $b_i$, and $c_i$, are reserved for timing. The bits $a_i$ form a maximum-length pseudorandom code sequence of length 127 bits (=$2^7-1$, a prime number). The sequence is endlessly repeated.

Similarly, the bits $b_i$ and $c_i$ form maximum-length pseudorandom code sequences of length 255 bits (=$2^8-1=3*5*17$) and 511 bits (=$2^9-1=7*73$), respectively The latter sequences are also endlessly repeated.

The lengths of the sequences $a_i$, $b_i$ and $c_i$ do not have common factors and the combined cycle length of the three sequences is therefore 127*255*511=16,548,735 word periods. Their origin bits start in the same frame. It then follows from the Chinese remainder theorem of number theory (see e.g. W. E. Deskins: Abstract algebra, Dover 1995) that knowing the phase of all three sequences at a certain time instant uniquely determines that instant modulo 16,548,735 word periods.

Assuming a bit duration of 4 ms (proposed for Galileo), the phase of the combined sequence therefore determines absolute time modulo 1985848,2 seconds=22,98 days. The mechanism thus has at least the same time span than the time-of-week counter of GPS.

To determine the phase (relative bit position within the pseudorandom sequence) of the combined sequence [$a_i$, $b_i$, $c_i$] it is sufficient to know the phases of the three bit sequences individually. To determine the phase of a single pseudorandom sequence of length $2^n-1$ it is sufficient to know only n consecutive bits in the sequence (think of the shift register used to generate the sequence: it always contains the last n bits of the sequence and the state of the register fully determines the sequence in the past and in the future). It is thus sufficient to receive the time information bits from nine consecutive words to determine the time-of-week. This would take 9*30*4 ms=1.08s.

All three bits sequences $a_i$, $b_i$, $c_i$ have a particular bit, e.g. their origin bit associated with a reference transmission time.

If noise prohibits the reliable detection of n consecutive bits, it is possible to detect the phase of the sequence with any required level of reliability by searcher techniques, e.g. by correlating the bit samples with a locally generated replica. The search can be done either in a sequential or parallel fashion, depending on the available hardware.

The method allows time transfer under both good and bad signal conditions whereas methods used so far are designed only for good signal conditions.

The speed of the method scales according to S/N ratio, allowing fast time transfer in good signal conditions and slower time transfer in bad signal conditions.

Using a few short pseudorandom codes instead of one long one has the benefit of rapid and HW efficient acquisition in both good and bad signal conditions. In bad signal conditions the number of candidate signal phases is small, which reduces false alarm probability.

The method makes optimal use of the transmission power allocated to the time information bits due to the almost delta-function like autocorrelation functions of the pseudorandom sequences. In theory, one could also accumulate the GPS 17 bit time-of-week fields (assuming that there were pilot signals and subframe synchronization) and correlate them with a locally generated replica sequence and achieve some coding gain. However, the idea would be arguably be inferior to the one proposed here because the autocorrelation properties of the sequence of 17 bit binary numbers is very poor since the strong mutual correlation of consecutive words makes the peak almost indistinguishable.

Figure 5:
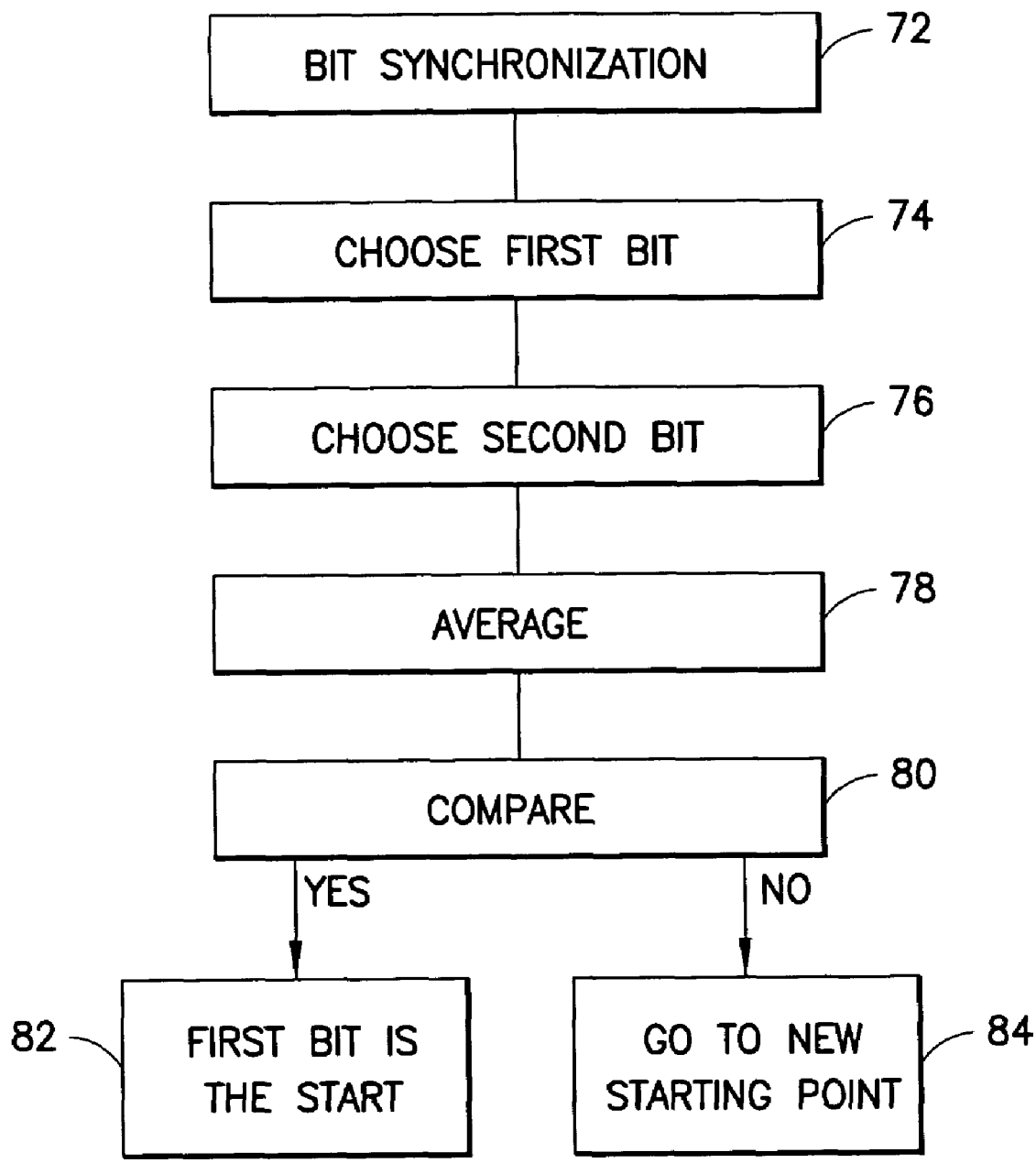
FIG. 5 shows the sequential steps involved in performing frame synchronisation according to one embodiment of the present invention.

Let us now turn to frame synchronisation using a synchronization prefix (FIG. 5). Consider one possible synchronization prefix is "11110". It could be used to create the following stream of message frames (or words):

```
     [11110*0*0*0][11110*0*0*0]
     [11110*0*0***0]...
     [11110*0*0***0]...
```

The symbols "0" and "1" constitute the fixed part of the frames. The symbols "x" constitute the changing part and can contain any data. This is an example only; many other prefix-synchronization codes can be conceived. For example, the ratio of synchronization bits to data bits can be varied and the symbol alphabet does not need to be binary.

The "x"s are spaced apart by "0" at regular intervals. The interval is every fourth bit. This is because the prefix length is four bits. This provides a unique pattern for the synchronisation prefix.

In the receiver, the apparatus starts at any one bit position. It considers the next four adjacent bits, and four bits starting at a position one frame length away. These two four bit sequences are averaged. Due to the nature of the prefixes, if the two series of four bits represent prefixes then the average should exceed a threshold.

For example, if the prefix is comprised of 1111, the threshold could be ⅞. Such a fraction threshold would be used as it is midway between the average of four 1s (i.e. 1) and the average of three 1s and a zero (i.e. ⅝) in the case the bit pattern considered was some combination of 1110.

If the prefix is 0000, then the threshold could be ⅛.

If prefixes are not found then other bit positions are considered.

Since the prefix has a unique bit pattern and since it is repeated at constant time intervals, a receiver can determine frame timing to a desired level of reliability and accuracy by using standard means of search such as a correlation receiver or a matched filter.

As seen in FIG. 5, assuming the prefix has a 4 bit length and comprises "1111", and the encoder in the transmitter has provided the prefix at the start of each frame, bit synchronization can be performed as indicated by block 72, a first bit can be chosen as a starting point and 3 bits adjacent to the first bit to provide a first set of bits as indicated by block 74, a second bit can be chosen as indicated by block 76. The second bit can be a frame length away from the first bit, and 3 bits adjacent the second bit are chosen to provide a second set of bits. The first and second set of bits can be averaged as indicated by block 78. The average can be compared to the threshold criterion to see if the average is at least equal to ⅞ as indicated by block 80. If YES, then the first bit of the first and second sets can be the start of the frame as indicated by block 82. As indicated by block 84, if NO, one can go to a new starting point to identify a new starting bit and repeat from block 74. Possibly, if the comparison is quite close to the threshold criterion, one can choose a new bit adjacent the first bit as a new starting point. The new adjacent bit can be sequentially before or after the previous chosen first bit.

Various embodiments may be made to the present invention without departing from the scope of the invention. For example, one or more processors and or memories may be used.

The invention claimed is:

1. An apparatus for determining a time of transmission of received frames, comprising one or more processors having respective inputs to receive a sequence of transmission frames, conforming to a transmission protocol, the sequence representing payload data, the payload data comprising time data representing the time of transmission of said frames from a particular transmitter, the payload time data being distributed within the transmission frames in a predefined manner according to the transmission protocol, one or more memories configured to store and to provide to the one or more processors the transmission protocol, to allow the one or more processors to compile the payload time data distributed within the received transmission frames;

a code provider configured to provide to the one or more processors one or more predetermined codes, said one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion;

and wherein the one or more processors are configured to use the memory to compile at least a portion of one or more distributed payload time data from a group of the transmission frames received at the input, and to compare the one or more compiled portions of received payload time data with the one or more predetermined codes received from the code provider to determine the time of transmission of the received frames.

2. An apparatus according to claim 1, wherein the apparatus is configured to use the payload time data distributed to always be positioned at the beginning of a frame to determine the transmission time of the received frames.

3. An apparatus according to claim 1, wherein the apparatus is a satellite navigation receiver.

4. An apparatus according to claim 1, wherein the one or more processors are configured to determine the transmission time of one or more frames.

5. An apparatus according to claim 1, wherein the apparatus is configured to use the received payload time data distributed as a repeating pattern within the transmission frames to determine the transmission time of the received frames, the one or more processors configured to associate the start of the repeating pattern with the known reference transmission time.

6. An apparatus according to claim 1, wherein the one or more processors are configured to compile the payload time data from a first frame received at the input to determine the transmission time of received frames.

7. An apparatus according to claim 1, wherein the apparatus is configured to use the payload time data distributed in each frame of a consecutive sequence of the group of transmission frames to determine the transmission time of the received frames.

8. An apparatus according to claim 1, wherein the apparatus is configured to use the payload time data represented by one or more bits which are distributed in the received frames of the transmission sequence in a predetermined manner to determine the transmission time of the received frames.

9. An apparatus according to claim 1, wherein the apparatus is configured to use the payload time data distributed within frames of the received transmission sequence which occupy the same bit position in each frame to determine the transmission time of the received frames.

10. An apparatus according to claim 1, wherein the apparatus is configured to use the payload time data which is distributed using a plurality of codes to determine the transmission time of the received frames, the start of each of the codes associated with the same frame.

11. An apparatus according to claim 10, wherein the apparatus is configured to use the payload time data distributed within frames of the received transmission sequence in adjacent bit positions in the same frame to determine the transmission time of the received frames.

12. An apparatus according to claim 1, wherein one code is a pseudorandom code.

13. An apparatus according to claim 10, wherein one code is a different length to another code.

14. An apparatus according to claim 10, wherein two or more codes are different pseudorandom codes.

15. An apparatus according to claim 10, wherein the receiver is configured to use codes having different bit sequence lengths which do not have a common factor to determine the transmission time of the received frames.

16. An apparatus according to claim 1, wherein the frames comprise a repeated data structure.

17. An apparatus according to claim 16, wherein the data structure has a fixed length.

18. An apparatus according to claim 1, wherein one or more codes are configured to repeat.

19. An apparatus for providing the time of transmission of transmitted frames, comprising one or more processors having respective inputs to receive payload data, the one or more processors configured to represent the payload data as a sequence of transmission frames conforming to a transmission protocol, the payload data comprising time data representing the time of transmission of said frames from a transmitter, the one or more processors configured to distribute the payload time data within the transmission frames in a predefined manner according to the transmission protocol, and wherein the payload time data is formed from one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion.

20. An apparatus for determining the presence of a frame synchronisation prefix in a sequence of transmission frames, the frames comprising a sequence of bits, a portion of the sequence of bits providing a frame synchronisation prefix having a particular prefix length with bit values which when summed are substantially unique in the bit sequence, the apparatus comprising:

an input to receive a sequence of transmission frames; and one or more processors configured to sum the bit values of a first sequence of bits having a length corresponding to a prefix length and one or more of a second sequence of bits having a length corresponding to a prefix length, the first and one or more second analysed prefix length bit sequences being spaced apart by multiples of a frame length, and wherein the one or more processors are configured to compare the summed bit values from the first and one or more second bit sequences to one or more predetermined threshold prefix bit values to determine the presence of a synchronisation prefix.

21. An apparatus according to claim 20, wherein the apparatus is configured to use a prefix having a bit sequence with bit values completely comprised of 1s, and an associated predetermined threshold prefix bit value, to determine the presence of the synchronisation prefix.

22. An apparatus according to claim 20, wherein the apparatus is configured to use a prefix having a bit sequence with bit values completely comprised of 0s, and an associated predetermined threshold prefix bit value, to determine the presence of the synchronisation prefix.

23. An apparatus according to claim 20, wherein the apparatus is configured to use prefix having a bit sequence having a repetitive pattern of bit values comprising of 1s and/or 0s, and an associated predetermined threshold prefix bit value, to determine the presence of the synchronisation prefix.

24. An apparatus according to claim 20, wherein the apparatus is configured to use synchronisation prefixes provided at the beginning of each frame, to designate the beginning of a corresponding frame, to determine the beginning of a frame.

25. An apparatus according to claim 20, wherein the apparatus is configured to sum the bit values from two or more frame length spaced apart prefix length bit sequences to determine the presence of the synchronisation prefix.

26. An apparatus according to claim 20, wherein the apparatus is configured to analyse the bit values of a first set of frame length spaced apart prefix length bit sequences, and if the predetermined threshold has not been met, then analyse the bit values of a second different set of frame length spaced apart prefix length bit sequences to determine the presence of the synchronisation prefix.

27. An apparatus according to claim 21, wherein the apparatus is configured to analyse the first and second sets at the same time.

28. An apparatus according to claim 20, wherein the apparatus is a satellite navigation receiver.

29. An apparatus according to claim 20, wherein the apparatus is a receiver.

30. A method for performing frame synchronisation, the method comprising:
receiving a sequence of transmission frames, the frames comprising a sequence of bits, a portion of the sequence of bits for providing a frame synchronisation prefix having a prefix length with bit values which when summed are substantially unique in the bit sequence;
summing the bit values of a first sequence of bits having a length corresponding to a prefix length and one or more of second sequence of bits having a length corresponding to a prefix length, the first and one or more second analysed prefix length bit sequences being spaced apart by multiples of a frame length; and
comparing the summed values to one or more predetermined threshold prefix bit values to determine the presence of a synchronisation prefix to perform frame synchronisation.

31. A program storage device readable by machine, tangibly embodying a program of instructions executable by the machine for performing the method of claim 30.

32. An apparatus for providing a frame synchronisation prefix in a sequence of transmission frames, the frames comprising a sequence of bits, a portion of the sequence of bits for providing a frame synchronisation prefix having a prefix length with bit values which when summed are substantially unique in the bit sequence, the apparatus comprising:
one or more processors configured to provide the synchronisation prefix in the bit stream of the sequence of frames such that the synchronisation prefixes are spaced apart by a frame length.

33. A method for providing a frame synchronisation prefix in a sequence of transmission frames, the frames comprising a sequence of bits, a portion of the sequence of bits for providing a frame synchronisation prefix having a prefix length with bit values which when summed are substantially unique in the bit sequence, the method comprising:
providing the synchronisation prefix in the bit stream of the sequence of frames such that the synchronisation prefixes are spaced apart by a frame length.

34. A program storage device readable by machine, tangibly embodying a program of instructions executable by the machine for providing a frame synchronisation prefix according to the method of claim 33.

35. An apparatus according to claim 1, wherein the apparatus is a receiver.

36. An apparatus according to claim 19, wherein the apparatus is a satellite navigation transmitter.

37. A method of determining payload time data comprising:
receiving a sequence of transmission frames conforming to a transmission protocol representing payload data, the payload data comprising time data representing the time of transmission of said frames from a particular transmitter, the payload time data being distributed within the transmission frames in a predefined manner according to the transmission protocol;
providing the transmission protocol to allow compilation of the payload time data distributed within the received transmission frames;
providing one or more predetermined codes to perform a comparison with the compiled payload time data, said one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion; and
compiling at least a portion of one or more distributed payload time data from a group of the received transmission frames, and comparing the one or more compiled portions of received payload time data with the one or more predetermined codes to determine a time of transmission of received frames.

38. A program storage device readable by machine, tangibly embodying a program of instructions executable by the machine for determining payload time data according to the method of claim 37.

39. A method of distributing payload data for transmission comprising
receiving payload data;
representing the payload data as a sequence of transmission frames conforming to a transmission protocol, the payload data comprising time data representing the time of transmission of said frames from a transmitter, and
distributing the payload time data within the transmission frames in a predefined manner according to the transmission protocol, and wherein the payload time data is formed from one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion.

40. A program storage device readable by machine, tangibly embodying a program of instructions executable by the machine for distributing payload data for transmission according to the method of claim 39.

41. A means for determining a time of transmission of received frames, comprising one or more means for processing having a means for input to receive a sequence of transmission frames, conforming to a transmission protocol, the sequence representing payload data, the payload data comprising time data representing the time of transmission of said frames from a particular transmitter, the payload time data being distributed within the transmission frames in a predefined manner according to the transmission protocol,
one or more means for memory configured to store and to provide to the one or more means for processing the transmission protocol to allow the one or more means for processing to compile the payload time data distributed within the received transmission frames;

a means for providing code configured to provide to the one or more means for processing one or more predetermined codes, said one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion;

and wherein the one or more means for processing are configured to use the means for memory to compile at least a portion of one or more distributed payload time data from a group of the transmission frames received at the input, and to compare the one or more compiled portions of received payload time data with the one or more predetermined codes received from the code provider to determine a time of transmission of received frames.

42. A means for providing the time of transmission of transmitted frames, comprising one or more means for processing having a means for input to receive payload data, the one or more means for processing configured to represent the payload data as a sequence of transmission frames conforming to a transmission protocol, the payload data comprising time data representing the time of transmission of said frames from a transmitter, the one or more means for processing configured to distribute the payload time data within the transmission frames in a predefined manner according to the transmission protocol, and wherein the payload time data is formed from one or more codes used to represent the transmission time of respective frames, a reference portion of said code corresponding with a particular known reference transmission time of a frame comprising said code portion, and an offset portion of the one or more codes representing an offset transmission time of said offset portion with respect to the known reference transmission time of said reference portion.

43. A means for determining the presence of a frame synchronisation prefix in a sequence of transmission frames, the frames comprising a sequence of bits, a portion of the sequence of bits providing a frame synchronisation prefix having a particular prefix length with bit values which when summed are substantially unique in the bit sequence, the means for determining comprising:

means for input to receive a sequence of transmission frames; and one or more means for processing configured to sum the bit values of a first sequence of bits having a length corresponding to a prefix length and one or more of a second sequence of bits having a length corresponding to a prefix length, the first and one or more second analysed prefix length bit sequences being spaced apart by multiples of a frame length, and wherein the one or more means for processing are configured to compare the summed bit values to one or more predetermined threshold prefix bit values to determine the presence of a synchronisation prefix.

44. A means for providing a frame synchronisation prefix in a sequence of transmission frames, the frames comprising a sequence of bits, a portion of the sequence of bits for providing a frame synchronisation prefix having a prefix length with bit values which when summed are substantially unique in the bit sequence, the means for providing comprising:

one or more means for processing configured to provide the synchronisation prefix in the bit stream of the sequence of frames such that the synchronisation prefixes are spaced apart by a frame length.

\* \* \* \* \*